United States Patent
Porter et al.

(10) Patent No.: US 6,865,333 B2
(45) Date of Patent: Mar. 8, 2005

(54) VISUAL ALIGNMENT OF MULTIPLE-REFLECTOR COLLIMATION SYSTEM

(75) Inventors: David R. Porter, Huntsville, AL (US); David E. Lloyd, Huntsville, AL (US)

(73) Assignee: SCI Systems, Inc., Huntsville, AL (US)

( * ) Notice: Subject to any disclaimer, the term of this patent is extended or adjusted under 35 U.S.C. 154(b) by 634 days.

(21) Appl. No.: 10/013,758

(22) Filed: Dec. 10, 2001

(65) Prior Publication Data

US 2004/0228601 A1 Nov. 18, 2004

Related U.S. Application Data

(63) Continuation-in-part of application No. 09/909,100, filed on Jul. 19, 2001, now Pat. No. 6,625,376
(60) Provisional application No. 60/267,544, filed on Feb. 9, 2001.

(51) Int. Cl.[7] ................................................. G02B 6/36
(52) U.S. Cl. ............................ 385/139; 385/73; 385/76
(58) Field of Search ......................... 385/139, 15, 60, 385/69, 70, 73–76, 84

(56) References Cited

U.S. PATENT DOCUMENTS

| | | | |
|---|---|---|---|
| 3,960,531 A | | 6/1976 | Kohanzadeh et al. .......... 65/4 B |
| 4,185,885 A | * | 1/1980 | Chown et al. ................. 385/73 |
| 4,548,630 A | | 10/1985 | Biedka ............................ 65/2 |
| 4,715,876 A | | 12/1987 | Osaka et al. .................. 65/4.21 |
| 4,896,935 A | * | 1/1990 | Lee ............................... 385/22 |
| 5,035,482 A | | 7/1991 | ten Berge et al. ......... 350/96.2 |
| 5,163,113 A | | 11/1992 | Melman ....................... 385/31 |
| 5,295,212 A | | 3/1994 | Morton et al. ................ 385/57 |
| 5,974,212 A | | 10/1999 | Saeki ............................ 385/37 |
| 6,023,542 A | | 2/2000 | Pan et al. ...................... 385/24 |
| 6,201,908 B1 | | 3/2001 | Grann ........................... 385/24 |
| 6,406,193 B1 | * | 6/2002 | Raj et al. ...................... 385/73 |

* cited by examiner

*Primary Examiner*—Michael C. Zarroli
(74) *Attorney, Agent, or Firm*—Kramer Levin Naftalis & Frankel LLP; Lanier Ford Shaver & Payne P.C.

(57) ABSTRACT

A multiple-reflector collimator and beam spreader is aligned with a source point by visual means, in addition to or instead of an electrical detector, in order to avoid the need to send a signal through the system to a detector in order to align the components.

17 Claims, 6 Drawing Sheets

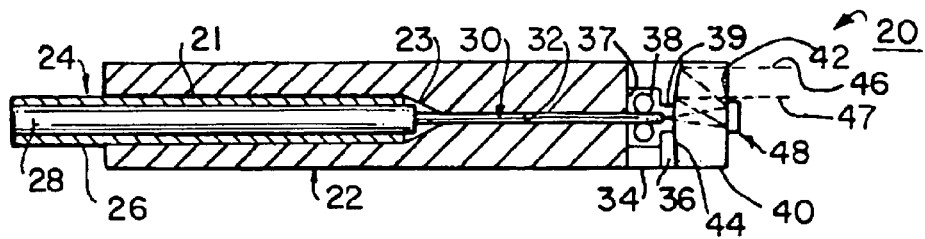
FIG. 1
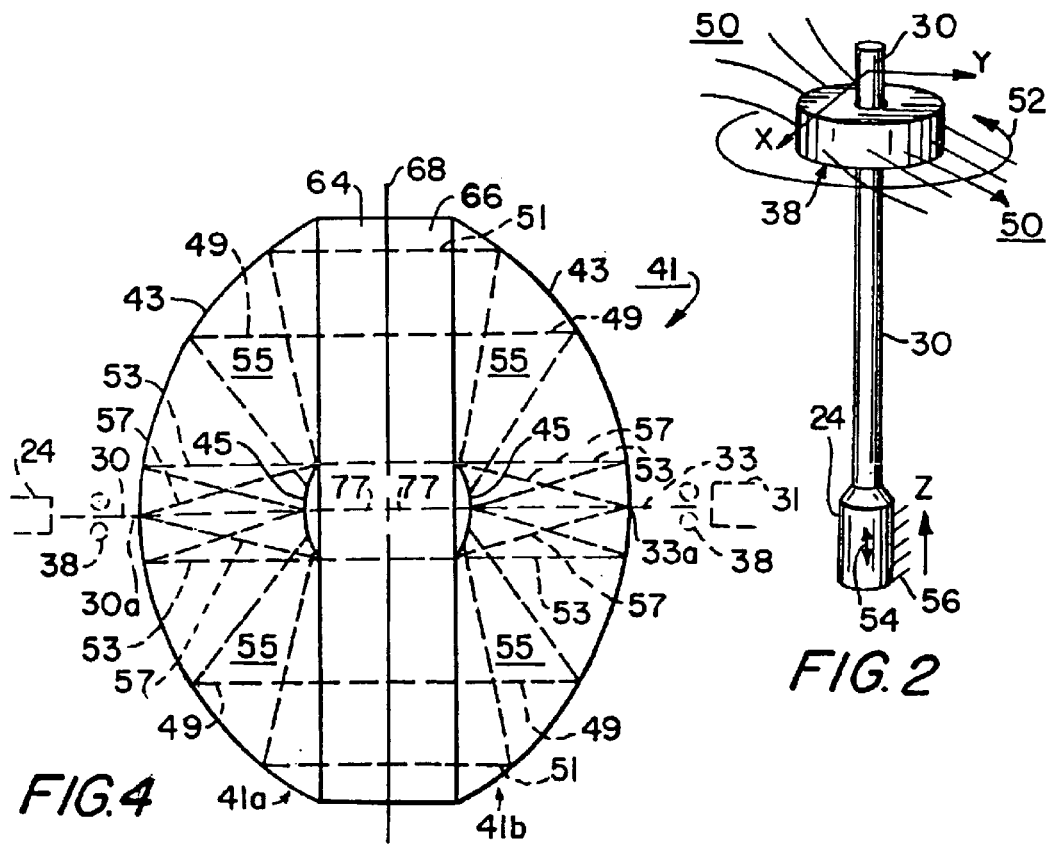
FIG. 4
FIG. 2
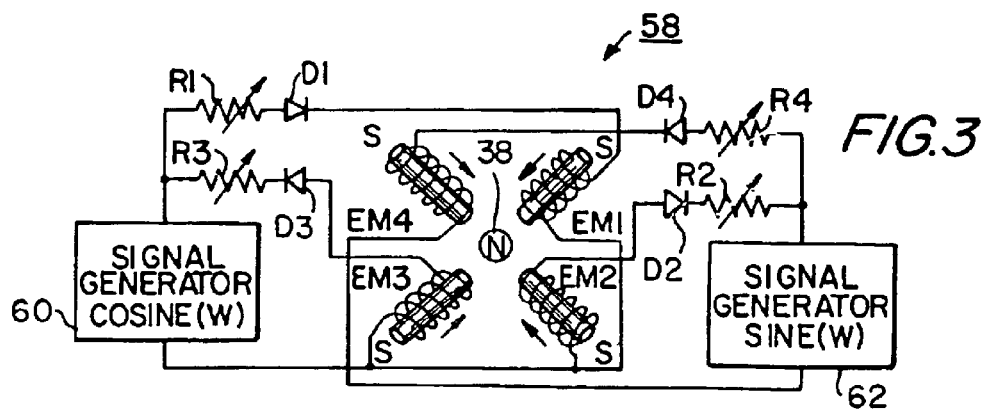
FIG. 3

VISUAL ALIGNMENT OF MULTIPLE-REFLECTOR COLLIMATION SYSTEM

This patent application is a continuation-in-part of U.S. patent applications Ser. No. 09/909,100, filed Jul. 19, 2001 now U.S. Pat. No. 6,625,376, and the U.S. patent application entitled "ELECTRO-OPTICAL TRANSDUCER", filed Oct. 22, 2001. Priority also is claimed in this patent application from a provisional patent application entitled PROJECT CASTLE, Ser. No. 60/267,544, filed in the United States Patent and Trademark Office on Feb. 9, 2001.

This invention relates to electro-optic transducers and optical transmission devices, and particularly to light-emitting and detecting transducers and light transmission systems therefor, and to devices and methods for aligning such systems and transducers. This invention also relates to fiber-optic cable, and particularly to termini, connectors, alignment devices and optical systems and methods for terminating and connecting fiber-optic cable.

The provision of optical transmission systems in the use of electro-optical transducers long has presented problems, particularly in communications systems using fiber-optic cable for transmission.

Coupling to electro-optical transducers has been complicated by the very small diameter of light beams transmitted as well as the small size of semiconductor devices often used to generate or detect the signals. Any foreign objects, such as dirt and dust, which accumulate in the optical path of the signals can seriously compromise the integrity and operability of the system.

Difficult problems specific to the use of fiber-optic cable for transmission also are well known. For example, providing suitable end termini and connectors for connecting two fiber-optic cables together long has been a demanding problem. The problem has been exacerbated by the prevalent use of single-mode fiber-optic light conductors of an extremely small diameter, such as 8 micrometers (0.008 millimeters). Aligning the cables accurately usually is a time-consuming and exacting process.

Standard commercial butt-joint type single-mode fiber-optic connectors suffer from numerous problems. First, they are relatively delicate, sensitive to dirt, difficult to clean, and easily damaged. The problems are even greater with multi-channel connectors which must function in a hostile environment.

In the past, various proposals have been made to improve such prior connectors. Included are proposals to use expanded-beam type connectors. Such connectors use different types of lenses to collimate and spread the beam of light emitted from the optical conductor. Then, an identical lens system is used to terminate another cable end to be coupled to the first cable, and the two termini are connected together. The second lens system re-focuses the beam on the second optical conductor so as to transmit the signal through the second cable.

The optical systems used in such prior expanded-beam connectors include spherical lenses, "GRIN" lenses (graded index lenses) and molded aspheric lenses to expand and collimate the light beam.

The advantages of such expanded beam connectors includes minimizing the sensitivity to dirt and lateral misalignment and to the size of the gap between the ends of the optical conductors.

However, prior expanded beam connectors and techniques suffer from several problems. Such problems include relatively high optical losses and high cost. In fact, the cost has been considered to be prohibitive for many commercial applications. Furthermore, it is believed that the prior designs are relatively difficult or even impossible to be installed correctly in the field; that is, outside of a factory, laboratory, or other such facility.

Accordingly, it is an object of the present invention to provide an electro-optic transducer device, and a fiber-optic cable terminus, connector and alignment device and method which overcome or alleviate the foregoing problems.

More specifically, it is an object of the invention to provide an expanded-beam type terminus and connector and alignment device and method which overcome or reduce the problems experienced with prior expanded beam devices.

In particular, it is an object of the invention to provide an electro-optical transducer and fiber-optic cable terminus and connector which has as many of the following favorable attributes as possible: low cost; low loss; low back-reflection; small size; ruggedness; insensitivity to dirt; ease of cleaning; capability of being installed in the field; high optical power throughput capability; suitability for use in hostile environments; and capability of being standardized.

It is also an object of the invention to provide such a device and method capable of operating with single mode optical conductors; with multi-channel cable; is relatively non-dichroic; and preserves polarization of the light being conducted.

It is another object of the invention to provide an integrated multiple-reflector optical device for expanding and collimating light beams and particularly fiber-optic cable light beams.

In accordance with the present invention, the foregoing objects are met by the provision of an electro-optical transducer with an input/output optical transmission system in which the output is spread by a double-reflector optical system which avoids the problems of using refracting devices for such purposes.

The double-reflector system preferably is coupled to the transducer either directly, or through a light conductor such as a fiber-optic cable.

Preferably, the fiber-optic conductor and the double-reflector system are aligned with one another by coupling one of them to a magnetically permeable number and using magnetic flux to move the member.

The objects of the invention, as it relates to fiber-optic cable, also are met by the provision of a fiber-optic cable terminus, connector and alignment device and method as follows.

A terminus having a first reflector for reflecting the beam received from one optical conductor is provided. A second reflector reflects the beams from the first reflector to form expanded and collimated light beams.

Preferably, in both the transducer device and fiber-optic cable terminus, the system of reflectors is like that in a Cassegrainian or Ritchey-Chretien reflecting telescope system. Such systems have been used for many years in the field of astronomy. Applicants have recognized that, even though the telescope systems usually are very large and expensive, the small devices used in this invention can be made relatively inexpensively. The use of reflectors or mirrors rather than lenses tends to minimize the effects of refraction which so often increases the difficulty in the optical design process for the usual prior art proposals for beam-expanding connectors.

The resulting optical system is very compact, relatively amenable to standardization and inexpensive to manufacture.

In accordance with another feature of the present invention, the problem of aligning transducers or light conductors in fiber-optic cables is substantially alleviated by coupling a magnetically permeable element to the object to be aligned, applying a magnetic field to the magnetically permeable member, and controlling the field to move and align the objects with one another. Movement in at least two orthogonal axes is preferred.

Preferably, proper alignment is tested by passing a signal through the conductor and a second conductor, and determining when the signal transmission is maximized. In addition, or instead, alignment can be done visually, with the aid of a microscope or other viewing device looking through the outlet of the reflector system to detect the source point, that is, the end of the fiber optic cable conductor, or the transducer input/output port, etc.

Preferably, a video camera with a zoom microscope lens is used to view the source point. The image of the source point is displayed, along with a target, and the position adjusting system is used to achieved alignment.

The optical conductor and the other components then are fixed in position relative to one another. Preferably, this is done by injecting a radiation-curable plastic material such as epoxy resin into the area surrounding the components, and irradiating the material to harden it when the alignment is correct. Specifically, an embodiment of the invention uses light-curable epoxy resin. Light is directed to the epoxy to perform the curing.

It also is preferred that the magnetic field source be one for developing a rotating magnetic field which rotates around the object to be aligned, with an electrical network being provided to control the field. This allows movement of the effective center of the magnetic field, and precise positioning of the object being aligned.

In one preferred embodiment, the magnetically permeable member is approximately toroidal or cylindrical, with a frustro-conical inlet to the central opening to guide the conducting fiber into the central opening during installation.

The invention also provides a compact integrated optical device for spreading and collimating light. A block of transparent material such as glass or plastic, is provided with surfaces shaped to form reflectors of the size, shape and position desired, and then those surfaces are coated with a reflecting material such as metal. This can be done at a reasonable cost by vapor deposition, sputtering, etc.

A problem often encountered in joining two ends of a fiber optic cable together is the problem of back-reflections of signals at the fiberglass-to-air interface between the ends of the cable cores.

This problem has been solved in the past by use of various techniques, such as rounding the ends of the fiber; making the ends very flat and butting the ends together to eliminate the air gap; filling the air gap with an index-matching gel, etc. Each of these methods has drawbacks.

It is believed that the interface between the air and the exit surface of the integrated reflector unit of this invention is subject to the same problem of back-reflections as any other light-transmitting solid-to-air interface. Therefore, it is another object of the invention to suppress such back-reflections without the disadvantages of the prior methods.

In accordance with another aspect of the invention, reflections are suppressed by giving the beam-spreading output surface of the light transmitting block a slight curvature so that the reflected beams are reflected along paths that are different from the paths taken by the rays to be collimated and focused. Therefore, they largely fail to reach the source point, and they are thus suppressed. As a result, a relatively high degree of suppression is achieved, without the use of a gel or other known techniques.

If desired, the broad input/output surface of the block also can be given an anti-reflective coating to aid in suppressing the reflections.

The foregoing and other objects and advantages of the invention will be set forth in or apparent from the following description and drawings.

IN THE DRAWINGS

FIG. 1 is a cross-sectional view of a fiber-optic cable terminus constructed in accordance with the present invention;

FIG. 2 is a perspective schematic view of a system and method for aligning the optical conductor of the cable shown in FIG. 1;

FIG. 3 is a schematic diagram of an electrical and magnetic circuit arrangement for use in aligning the optical conductor shown in FIGS. 1 and 2;

FIG. 4 is a cross-sectional, side elevation and schematic view of one embodiment of the expanded beam coupling device of the present invention;

Figure 12:
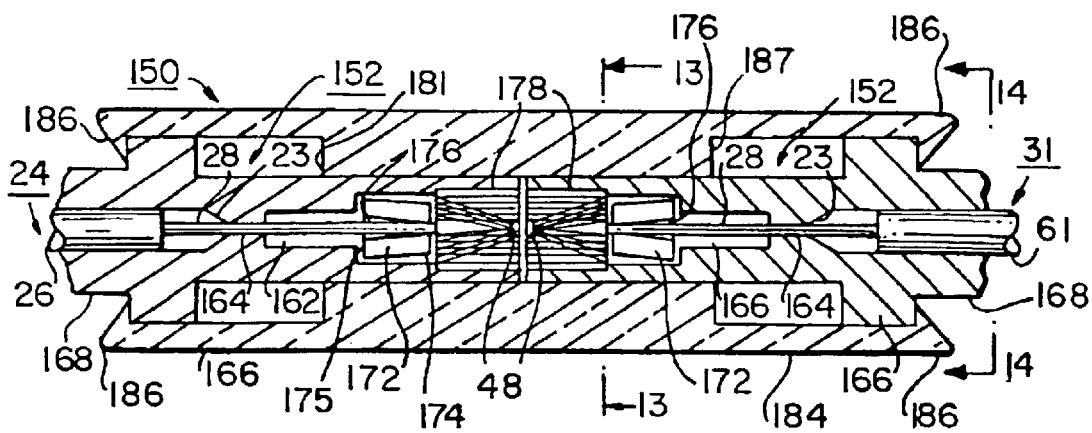
FIG. 12 is a cross-sectional view of the preferred coupler of the invention.
Figure 13:
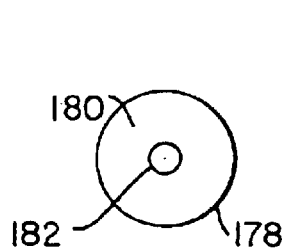
Figure 14:
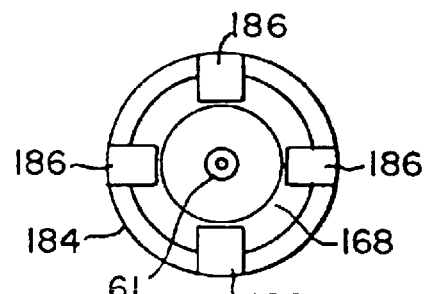
Figure 15:
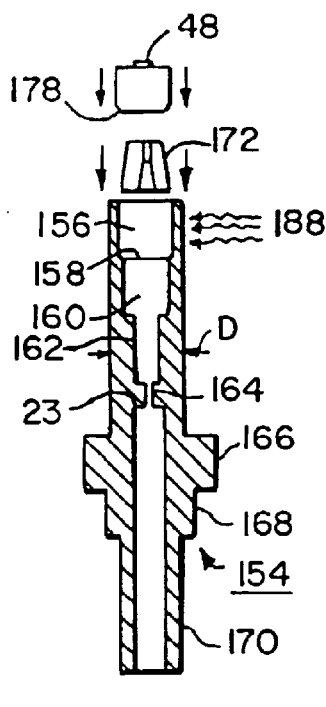
Figure 16:
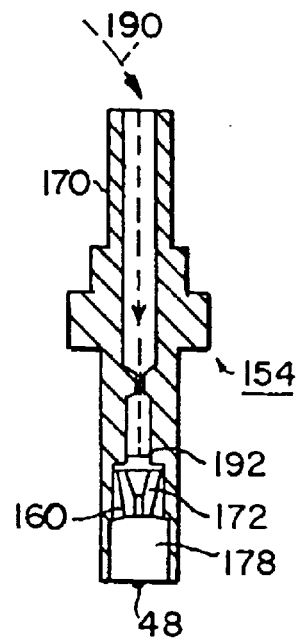
Figure 17:
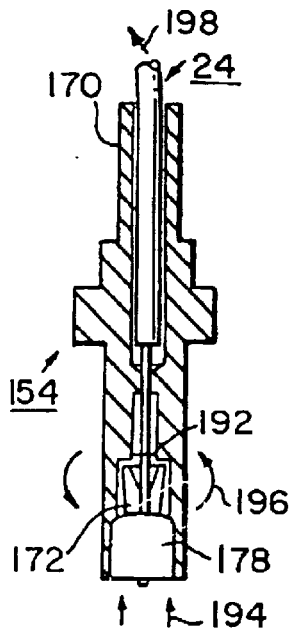
Figure 18:
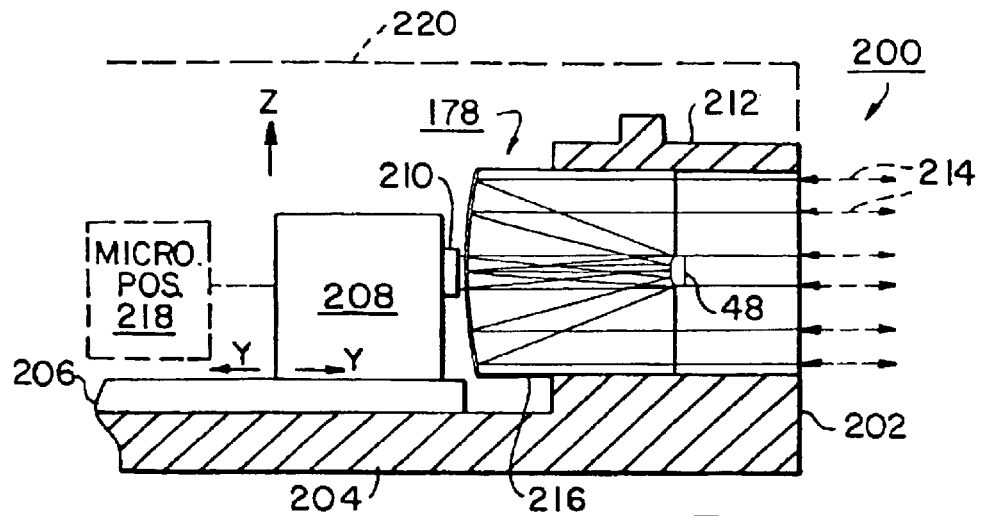
Figure 19:
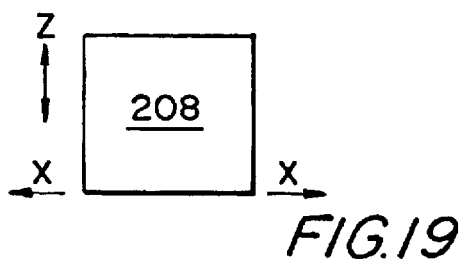
Figure 20:
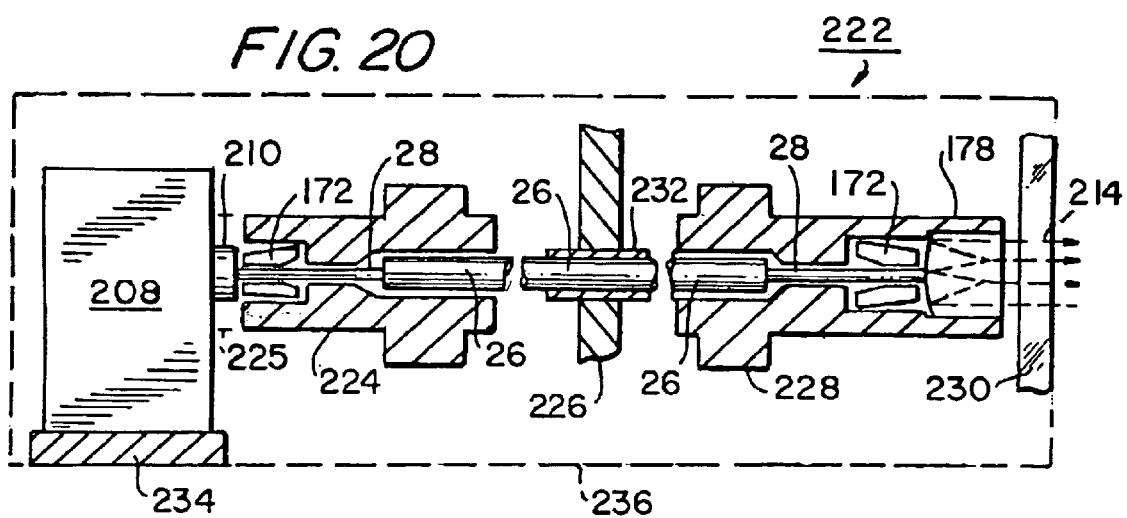
Figure 21:
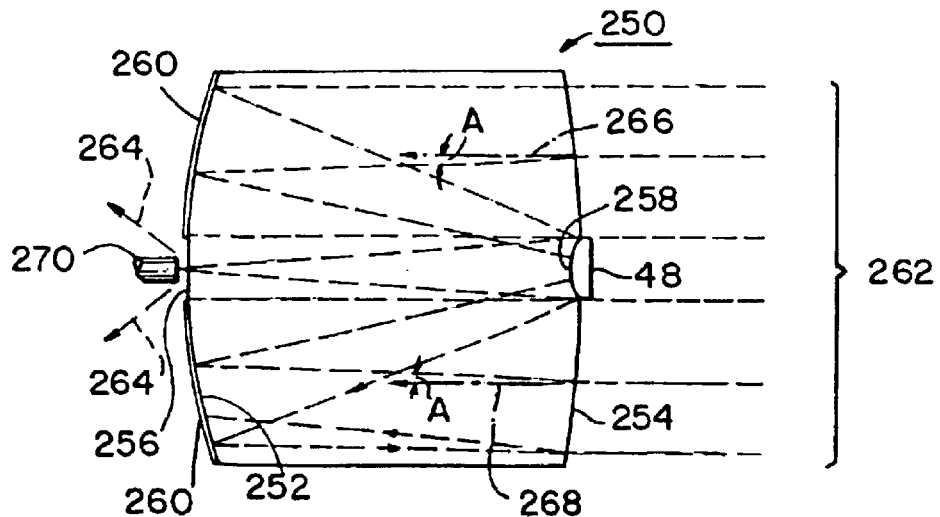
Figure 22:
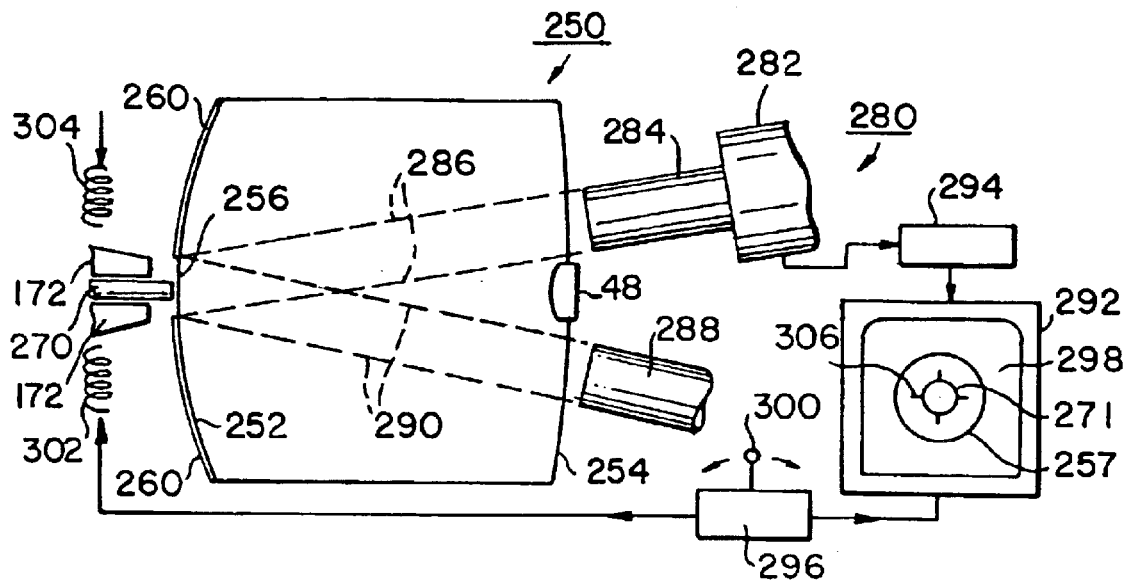

FIGS. 13 and 14 are, respectively, cross-sectional views taken along lines 13—13 and 14—14 of FIG. 12;

FIGS. 15 through 17 are partially schematic cross-sectional views illustrating the manufacture of one of the termini shown in FIG. 12;

FIG. 18 is a cross-sectional, partially schematic view of an electro-optical transducer device constructed in accordance with the invention;

FIG. 19 is a left-side elevation view of a component of the device of FIG. 18;

FIG. 20 is a cross-sectional, partially schematic view of another embodiment of the transducer device of the invention; and FIG. 21 is an enlarged cross-sectional view of another embodiment of the invention; and FIG. 22 is a view like that of FIG. 21 schematically illustrating another embodiment of the invention.

TERMINUS

FIG. 1 is a cross-sectional view of a fiber-optic cable terminus 20 constructed in accordance with the present invention.

Terminus 20 includes a standard ceramic ferrule 22 with a relatively large bore 21 which tapers down at 23 to form a substantially smaller fiber conductor passageway 32.

Fitted into the ferrule is the end of a fiber-optic cable 24 including a light-conducting single-mode fiber 30 extending through the passageway 32, and cladding 28 having an index of refraction different from that of the light-conducting core 30, and, finally, an outer protective coating 26. Typical dimensions for the cable are: The outer diameter of the cable with the coating 26 is 250 micrometers; the diameter of the cable without the coating 26 is 125 micrometers; and the diameter of the light-conducting fiber or core 30 is 8 micrometers.

The dimensions of the cable are small; especially the diameter of the core, which has a diameter of only 0.008 millimeters (around 0.0003 inches). Thus, it is difficult to properly align the end of the core 30 in the terminus 20 with the core in another cable to be coupled with the cable 24.

Attached at the right end of the ferrule 22 is a reflector mounting structure 34. A reflector unit 40 is attached to the mounting structure 34. A soft plastic cushioning pad 48 is secured to the right hand surface of the reflector unit 40. It cushions the terminus against damage, and covers and protects the central reflector on the end of the unit 40.

The reflector mounting structure 34 has a central cavity 37 in which is located a torroidal member 38 made of magnetically permeable material, such as iron, iron-nickel alloys, etc., comparable in size to a magnetic core memory element such as those used in magnetic core memories for many years.

The cavity 37 has an outlet opening 39. The light conductor or core element 30 extends through the center of the torroid 38 to a point abutting or near to the left hand surface 44 of the reflector unit 40.

The reflector unit 40 preferably is a solid transparent glass or plastic body member with a coating of metal (e.g., gold) or a dielectric coating on the curved left surface and the recessed right-hand central portion of the unit at 42. Thus, the reflector unit has a first small reflector 42 of a size sufficient to intercept all or substantially all of the light rays emitted from the conductor 30. The small reflector 42 is either flat or curved, and is tilted at an angle so that the light it receives is reflected backwardly to the large reflecting surface 44. Because of the angle of tilt of the reflector 42 and the curvature of the reflector 44, the light from the core is formed into a circular bundle of parallel (collimated) light rays 46–47 which extend parallel to the longitudinal axis of the ferrule towards the right in FIG. 1.

Although the preferred embodiment of the invention is described using single mode fiber, the invention also is useful with multi-mode fiber cables.

Gold is only one example of a metal which can be used to coat the curved surfaces of the transparent block to form reflectors. Other metals, such as silver, aluminum, etc., also can be used. Dielectric materials can be used instead of metals, if desired.

Preferably, the surfaces of the block which are not coated with a reflective material are coated with an anti-reflective coating in order to prevent unwanted reflections. Alternatively, or in addition, further reflection suppression is provided as shown in FIG. 21 and as described below.

The particular reflector unit 40 shown in FIG. 1 is a Ritchey-Chretien type of optical unit, which will be explained, in principle in connection with FIGS. 10 and 11 below.

However, the preferred embodiment of the invention uses a Cassegrainian type of optical unit, which is shown in FIG. 4 and will be explained next.

Cassegrainian Optical System

FIG. 4 is a schematic diagram showing two identical Cassegrainian reflector units 41a and 41b which are mated together face-to-face, by way of flat transparent plates 64 and 66, to form the basic optical units of one embodiment of the connector of the present invention. Light is emitted from the core 30 of the cable 24 and, through the optical coupling structure, to the core 33 of a second cable 31, thus providing a fiber-optic cable connector. Certain parts of the structure, including that used to mechanically secure the two halves of the coupler together, are omitted from FIG. 4 for the sake of clarity in the drawings.

Each of the two reflector units 41a and 41b is identical to the other, so that the same reference numerals are used for corresponding parts.

Each unit includes a small convex reflector 45 and a large concave reflector 43.

The small reflector 45 is made just large enough so as to intercept all or substantially all of the light rays 57 emitted from the core 30. The curvatures of the two reflectors 45 and 43 are predetermined so that each ray of light is reflected from the first reflector 45 onto the second reflector 43 and then exits the unit 41a along parallel lines 49, 51 and 53, for example, thus collimating the light.

In a classical Cassegrainian reflector system, the large or "primary" reflector 43 is a paraboloid and the small reflector 45 is a hyperboloid. However, the surfaces of the two reflectors can have any other shape which produces the desired results.

The light from the core 30 of the cable 24 enters the reflection unit 41(a) through a hole 30 in the primary reflector 43 on the axis of rotation 77 of the paraboloid or other surface of rotation forming the reflector.

The collimated light rays then are received by the reflector 43 of the second reflector unit 41b and are reflected back to the reflector 45 and are transmitted through an aperture 33a in the reflector 43a on the axis 77 and are focused at the end of the second core 33. Thus, the light is transmitted to the second cable 31.

Advantageously, each of the units 41a and 41b is made by a relatively simple process.

First, the body is machined or molded out of transparent optical glass or plastic with the curved surfaces at the two reflector locations, 43 and 45. The glass or plastic has an index of refraction which is closely matched to that of the core 30. The solid material of the two units 41a and 41b is indicated by the reference numerals 55 in FIG. 4. Then, the outside surfaces at 45 and 43 are coated with a metal, such as gold, by a process such as vapor deposition or sputtering, to form the reflectors, and an anti-reflective coating is applied to the light-transmitting output surfaces. This process produces small, sturdy, accurate integrated reflector units at a relatively modest cost.

Clear plastic or glass plates 64 and 66 then are attached to the flat surfaces of the reflector bodies 41a and 41b, respectively, by the use of an adhesive, such as an index-matching transparent epoxy. This is done so that the mating surfaces at 68 can be made extremely flat and thus virtually eliminate the possibility of angular skew of the two units 41a and 41b with respect to one another.

Alternatively, the two termini can be aligned by use of the optical method described elsewhere herein, and the plates 64 and 66 can be eliminated.

A modification of the foregoing is one in which holes are formed in the blocks 41a and 41b along the optical axis 77 with the end of the light conductor 30 inserted into the hole. This enables adjustment of position of the end of the light conductor closer to the reflector 45. If this modification is used, the diameter of the hole should be made large enough to permit movement of the conductor 30 for alignment purposes.

Coupler

Figure 5:
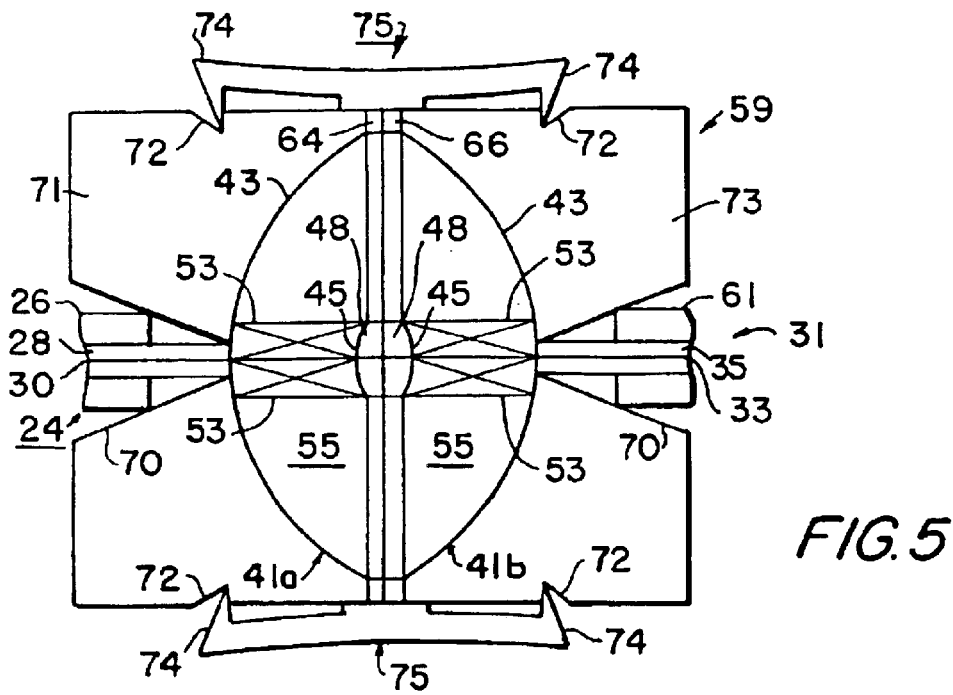
FIG. 5 is a cross-sectional view, partially schematic, of a completed coupler coupling the ends of two fiber-optic cables together.

FIG. 5 is a cross-sectional view of a coupler 59 similar to the one shown schematically in FIG. 4. The two reflector units 41a and 41b are secured to mounting blocks 71 and 73, respectively. Preferably, the blocks 71 and 73 are molded of opaque plastic or glass material. The body 71 has a frustro-conical cable entrance opening 70, and the block 73 has a cable entry opening 70 identical to the one in block 71. The frustro-conical openings ease the entry of the cables into the connector.

The cable 24 includes the protective coating 26, the cladding 28, and the core 30. The cable 31 includes the outside protective coating 61, cladding 35 and the core 33.

Each of the bodies 71 and 73 has a circumferential groove 72 adapted to receive the sharp inwardly-extending edges 74 of a clasp 75 which holds the two halves of the coupler 59 together. The clasp 75 is one of a number of different well-known devices for holding the two halves of a fiber-optic coupler together. Any of such other devices can be used, in accordance with the present invention, since the clasp or other securing structure does not form a part of the invention claimed herein.

It is preferred that the plates 64 and 66 be replaced with the bumpers 48, and that the alignment method described below be used to align the cable cores.

It also should be understood that the cable terminus 20 shown in FIG. 1 normally will be used as part of a cable coupler consisting of another terminus 20 connected to another cable, and a clasp or other securing structure to fasten the terminus structures together.

Because the coupler spreads the light beam passing through the tiny light conductor 30 so very much, the sensitivity of the coupler to dirt and to alignment errors in a lateral direction (e.g., vertically or perpendicular to the drawing in FIG. 4) is greatly reduced. By accurately collimating the light, the sensitivity to errors in the distance separating the two coupler halves is virtually eliminated Moreover, the grave disadvantages in using a lens or other refracting device to spread and collimate the light are largely eliminated.

Alignment Device and Method

Figure 9:
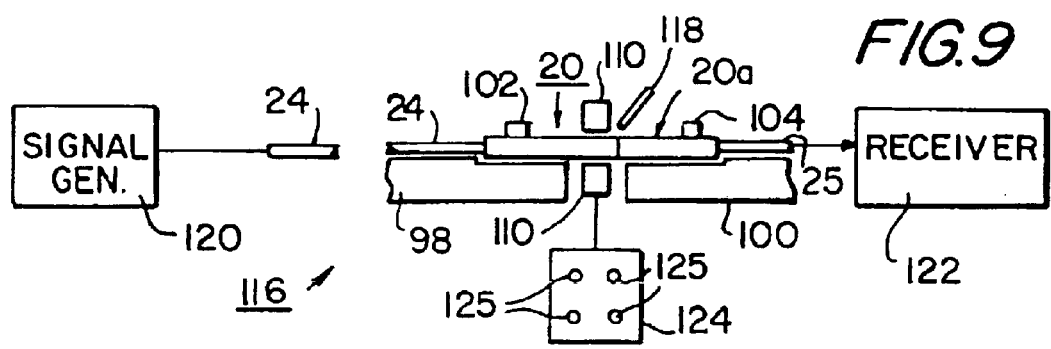
FIG. 9 is a schematic diagram of another embodiment of the alignment apparatus and method of the present invention.

FIGS. 2, 3 and 9 show one embodiment of the alignment device and method of the present invention.

FIG. 3 is a schematic diagram showing a rotary magnetic field-developing and control device 58 used to create and control a rotating magnetic field around the torroidal magnetic element 38 inside the terminus 20.

As it can be seen in FIG. 1, there is substantial amount of space between the element 38 and the walls of its cavity 37 so that it can be moved from side-to-side in essentially any radial direction in order to align the optical conductor 30 with a target such as another fiber-optic conductor in another cable.

The rotary field developing device is of a structure conventional for forming rotating magnetic fields for use in electric motors, with some exceptions. Four pole pieces EM1, EM2, EM3 and EM4 are spaced at equal angular intervals about the magnetic member 38. Basically, each of the pole pieces is located 90° from its neighbor. A cosine signal generator 60 supplies a voltage with a cosine wave form to the windings as shown, through diodes D1 and D3 and resistors R1 and R3.

A sine wave signal generator 62 is provided and supplies sine wave voltage through diodes D2 and D4 and resistors R2 and R4 to the windings as shown. This creates a magnetic field which rotates about a center point.

Each of the four resistors R1, R2, R3 and R4 is separately variable so as to enable the signal supplied to each of the pole pieces to be varied in magnitude so as to move the effective center point or neutral flux point of the rotating magnetic field.

FIG. 2 is a perspective view showing the light conductor or core 30 extending through the center of the magnetic element 38. The cable 24 is clamped in a clamping device comprising a V-groove support member 98 (FIG. 9) and a clamp 102 to hold the cable 24 in a given position. The markings 56 in FIG. 2 indicate schematically that the cable 24 is held in place. The pole pieces of the rotary field device 58, shown in FIG. 3, are represented schematically at 110 in FIG. 9. They surround the right end of the terminus 20 with the magnetic member 38 located in the center as shown in FIG. 3.

The cable and the light conductor 30 can be moved along the Z-axis; that is, in the directions indicated by arrow 54, by means of a standard micrometer adjustment mechanism provided in existing alignment devices. The Z-axis positioning is not critical. However, positioning along the X and Y-axes shown in FIG. 2 is.

The circular arrow 52 in FIG. 2 indicates the direction in which the magnetic field rotates around the member 38. The lines 50 in that Figure illustrate the lines of force of the magnetic field at a particular moment during its rotation.

Referring again to FIG. 9, the control unit 124 contains the circuitry shown in FIG. 3 and supplies signals to the windings represented at 110. It has four knobs 125, each of which controls one of the four variable resistors of the circuit. By this means, the balance of the field can be modified so as to move the torroid 38 to virtually any position within the cavity 37 in the X-Y plane shown in FIG. 2.

As it is shown in FIG. 9, a second V-groove support block 100 supports a second terminus 20 a terminating a second cable 25. The cable 25 is held in place by a clamp 104.

Referring again to FIG. 1, the reflector base unit 34 has a hole 36 which allows the injection of an uncured epoxy resin into the chamber 37 to completely surround the magnetic torroid 38 and the end of the optical fiber conductor. A hypodermic needle type of applicator can be used for this purpose.

Referring again to FIG. 9, a light signal generator 120 is provided to send a test signal through the cable 24 to the terminus 20. The left end of the terminus 20a supported on the block is shown in abutment with the right end of the terminus 20. However, the termini can be separated by a significant distance, without creating any significant error, due to the fact that the light transmitted between them is collimated. The resulting signal transmitted through the two cables is delivered to a receiver 122 which converts the signal into representative electrical signals indicating the magnitude of the signal transmitted.

In accordance with one aspect of the present invention, the viscous epoxy injected into the terminus 20 is curable by means of outside radiant energy. In this case, the epoxy preferably is a light-curable epoxy, such as that made by the Loctite Company, as well as by others. The epoxy is selected to have an index of refraction closely matching that of the core 30 and the glass or plastic mirror body.

Still referring to FIG. 9, a light source 118 of the proper wave length is provided to shine light on the area near the right end of the terminus 20, or on the outlet end of the terminus. The transparent housing and/or the optical system itself transmits the light to the epoxy resin.

The rotary field developing device in the unit 124 is energized, as is the signal generator 120 and the receiver 122. By adjustment of the resistors R1–R4 by use of the knobs 125, the core 30 of the cable 24 can be properly aligned with the core of the cable 25 shown in FIG. 9. The proper alignment will be detected as the position in which the signal received by the receiver is at a maximum. When this point is reached, further adjustment is stopped, and the light from the light source 118 is used to cure the epoxy resin and fix the position of the core. The alignment then is complete.

Preferably, the light-curable epoxy resin has a relatively low viscosity at the start of the alignment procedure and thickens (increases in viscosity) during the procedure, usually requiring a few seconds to cure completely. Advantageously, the larger adjusting movements are most likely to be needed early in the curing process when viscosity is low, and finer adjustments later. Thus, curing of the epoxy and alignment can proceed simultaneously to speed the alignment process.

Preferably, the alignment procedure can be automated by use of a closed-loop control system and a computer programmed to use an algorithm that automatically adjusts the balance of the field to align the terminal so that the signal received by the receiver is a maximum.

The core in the cable 25 in the right hand terminus in FIG. 9 preferably has been aligned already before the above alignment procedure is started. Thus, the cable 25 and its terminus can be used as a "standard" to provide alignment of the cores of many different termini like terminus 20. Alternatively, the cable 25 can be an actual piece of cable to which a coupling is desired to be made.

Although the use of a controllable rotating magnetic field has been described as the preferred device for adjusting the core position, other variable magnetic field generating devices also can be used, as long as they produce variable fields in at least two orthogonal directions, so as to enable the positioning of the core in a wide variety of locations in the x-y plane.

In another embodiment of the alignment device and method of the invention, instead of using a magnetically permeable member surrounding the fiber optic cable core, one or more magnetically permeable bands can be formed around the body of the reflector unit 40. The unit 40 fits into the ferrule loosely so that it can move, and the rotating magnetic field is used to move the reflector unit relative to the stationary fiber optic cable core to achieve alignment. The reflector unit 40 and the core 30 then are secured in alignment with one another by curing liquid epoxy surrounding the unit 40 and the end of the core.

Visual Alignment

FIG. 22 shows a visual alignment system which can be used together with the alignment system and method described above, or instead of that system.

In the system of FIG. 22, a viewing device 280 is used to look through the output surface 254 of the reflector block 250 to form an image of the source point, the cable end 270 and the flat 256 at which the end of the cable is to be located, or the input/output port of a transducer is to be located.

The viewing device 280 can be a microscope with its own light source sending light along a path indicated by dashed lines 286.

Preferably, the viewing device is a video camera 282 with a microscope zoom lens 284 which develops video signals forming an image of the flat portion of the reflector block 256 and the cable end 270 and sends those signals to a digital controller which processes the signals and sends the signals, after processing, to a video display monitor 292. The processing can include signal enhancement and other procedures to improve the images for the purposes at hand.

Monitor 292 has a screen 298 which displays an image of a target circle 257 formed on the flat at 256, as well as cross-hairs 306 and an image 271 at the end of the fiber optic conductor 270. The target circle 257 can be etched or otherwise formed on the surface of the flat 256 during manufacture.

A control unit 296 is provided to control the four orthogonal magnetic fields applied to the magnetic member 172 by four orthogonally-located coils, two of which are shown at 302 and 304 in FIG. 22. The signals to the coils are controlled by means of either a manual control such as a "joystick" 300, or, preferably, automatically by a computer program with a microcomputer in the unit 296, so as to align the fiber optical conductor end with the target 257, 306.

Because the viewing angle of the viewing device 280 is off-axis, the target 257 and fiber end image 271 may appear to be slightly oblate—that is, they might appear to have a greater height than width. It is believed that this will be acceptable and will not prevent accurate alignment. Moreover, the angle may give depth perception sufficient to enable detection of the axial position of the end of the conductor 270 relative to the flat 256 so as to enable adjustment of the position by a micropositioner to bring the conductor end into abutment with the flat 256.

Also shown in FIG. 22 is a curing radiation source 288 which transmits curing radiation along a path indicated by dashed lines 290 to the flat 256 for transmission into the area surrounding the end of the fiber conductor 270 to cure the liquid epoxy surrounding the conductor end to fix it in place after alignment is complete.

Preferably, the wavelength of the radiation produced by the curing source 288 is different from that of signals being transmitted through the cable conductor. For example, the wave lengths of most such signals are in the infra-red range, whereas the radiation from the source 288 preferably is in the ultra-violet or visible blue region of the electromagnetic spectrum. This has the advantage that signals transmitted from the fiber optic conductor 270 will not interfere with the proper curing of the epoxy. This facilitates attachment of the terminus to the end of a cable in the field, without turning off the signal source. This makes alignment in the field faster, easier and less expensive.

Normally, the wavelength of the light emitted by the lamp incorporated in or attached to the viewing device 280 will be different from that of the source 288 and signals transmitted through the fiber-optic cable. Ordinarily, that light will be visible. However, the wavelength of the light from the viewing device 280 can be selected to cure the epoxy so that the alignment and curing steps can proceed simultaneously, and the separate source 288 can be eliminated.

The alignment arrangement and method shown in FIG. 22 has significant advantages, especially for alignments made in the field. Because the alignment method does not depend on the transmission of signals through the fiber-optic cable, any signal which may be passing through the cable need not be turned off, and a receiver matched to those signals need not be provided. Furthermore, a second terminus and cable leading to the receiver is not needed. The visual alignment equipment can be compact and easily portable to facilitate use in the field.

Figure 8:
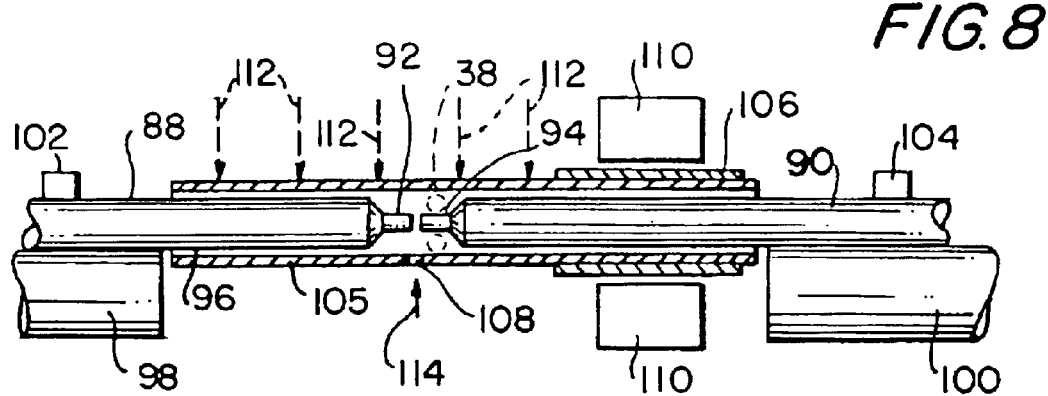
FIG. 8 is a cross-sectional and partially schematic view of another embodiment of the alignment device and method of the present invention.

In the factor or laboratory, the visual alignment method can be used as an adjunct to the alignment equipment shown in FIG. 8, or in place of that equipment, whenever it will save time or cost to do so.

Although the foregoing alignment arrangement and method have been described primarily in use with fiber optic cable, it should be understood that they are quite suitable for use in aligning the reflector unit 250 with a transducer, as shown in FIG. 18, or similar devices.

Splicing

FIG. 8 illustrates the use of the invention splicing fiber-optic cables together.

Unlike easily releasable couplers such as those described above, splices are intended to make a permanent connection between two cables. Therefore, they are less susceptible to problems such as dirt, etc., which plague releasable connectors, and beam expanders and collimators often are not needed.

Illustrated in FIG. 8 is a process which is used to splice two cables 88 and 90 together. First, a short length of cladding and exterior coating is removed from the end of each cable, such as shown at 92 and 94, and the core ends are cleaved, using conventional cleaving equipment and methods.

A transparent plastic or glass sleeve 105 is provided. It has an access hole as shown at 108. The interior diameter of the sleeve 105 is substantially larger than the outside diameter of the cables 88 and 90 so as to give the end of one or both of the cables room to move laterally in aligning the ends together. The cable 88 is held immobile by a V-block 98 and clamping device 102, and the other cable 90 is held by a similar block 100 and clamping device 104. The ends 92 and 94 are inserted into the sleeve 105 with the ends near but not touching one another.

In one embodiment of the splicing method, magnetically permeable sleeve 106 surrounds and is attached to the outside of the sleeve 105 at one end of the sleeve 105.

In performing the splice, the rotating magnetic field generator 110 is positioned around the sleeve 106 as shown in FIG. 8, and the controls of FIG. 9 and the signal generator 120 and receiver 122 of that Figure are used as described above to position the cores 92 and 94 in alignment with one another.

The mechanism by means of which this is done is that when the sleeve 106 is moved laterally by the magnetic field, it bears against the cable 90 which causes it to flex and to move the end 94.

Prior to the alignment, light-curable epoxy resin is injected as indicated at 114 through the hole 108 to fill the interior of the sleeve 105 around the ends of the two cables. When alignment has been reached, or before, if desired, a light source, indicated by the arrows 112 is energized to irradiate the epoxy and cure it. At the end of the process, the splice has been completed by solidly encapsulating the cable ends after alignment.

A second method for performing the alignment process during splicing also is illustrated in FIG. 8. Instead of the sleeve 106, the magnetic torroid 38, shown in FIGS. 1 and 2, is located around the end of one of the cables. Then, the rotating magnetic field source 110 is positioned around the member 38 and operated until the cables are aligned, in the manner disclosed above.

In this method it may be desirable to mechanically locate the other cable end approximately in the center of the sleeve before the alignment process and curing of epoxy steps are performed.

In either event, the cable ends can be aligned quickly, easily and accurately in the field.

Ritchey-Chretien Optical System

Figure 10:
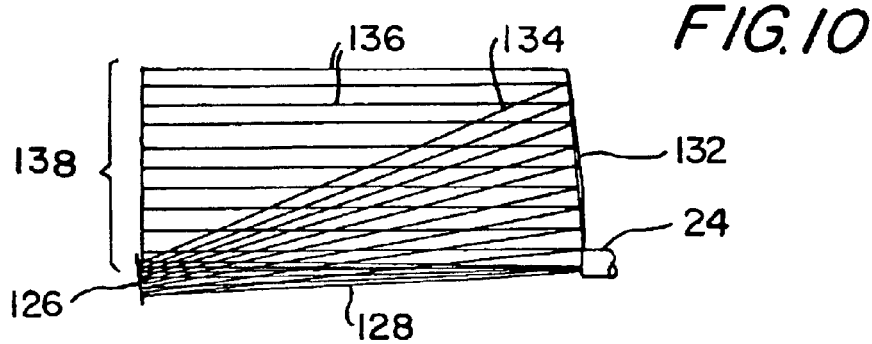
FIG. 10 is a schematic optical diagram of the light ray paths in another embodiment of the connector and terminus of the present invention.
Figure 11:
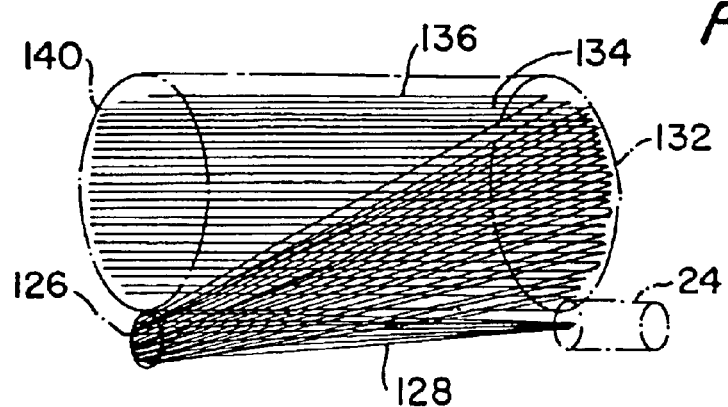
FIG. 11 is a perspective view corresponding to the side elevation view of FIG. 10.

FIGS. 10 and 11 are enlarged schematic views of the light paths of a typical Ritchey-Chretien system similar to that shown in FIG. 1. This system is characterized by the fact that the light source shown in FIG. 10 is not on axis with the large mirror. Therefore, there is no insertion loss due to the hole in the large mirror required in the Cassegrainian system described above. Thus, the Ritchey-Chretien system has its own merits and is useful in many circumstances. However, the spreading of the beam using such a system is less than in the Cassegrainian system, and it is believed that the Cassegrainian system is somewhat easier to manufacture.

As it is shown in FIGS. 10 and 11, the light rays 128 exiting from the output of the cable 24 are reflected off of a slightly curved reflector 126 which reflects the rays along lines 134 to a slightly curved large reflector 132. The curvature of that surface is hyperbolic or otherwise curved and is calculated to produce parallel reflected rays 136 over the vertical area 138, shown in FIG. 10.

As it is shown in FIG. 11, the area occupied by the rays 136 is approximately circular, as is the reflector area 132.

Again, the optical system shown in FIGS. 10 and 11 can be fabricated by molding a block out of optical glass or plastic and metal-coating the surfaces 126 and 132 by vapor deposition or sputtering, etc., to produce the reflecting surfaces. Thus, this optical system also is relatively less expensive than prior beam-expanding termini.

Alternative Optical Systems

Optical systems other than Cassegranian and Ritchey-Chretien systems can be used. An example is a Gregorian system, which is like a Cassegrainian system except that the Gregorian system uses a different-shaped first reflecting surface. Other known varieties also can be used.

Multi-Channel Connector

Figure 6:
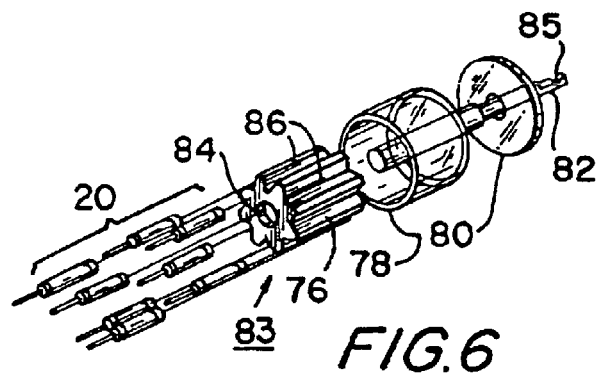
FIG. 6 is a perspective exploded view of a multi-channel fiber-optic cable terminus constructed in accordance with the present invention.

FIG. 6 is a perspective view of one terminus of a multi-channel connector. A plurality of fiber-optic cables (12 in this case) 20 are inserted into V-grooves 86 in a cog-wheel shaped support member 83 which has a central through-hole 84. A clear plastic or glass sleeve 78 fits around the outside of the termini 20 and holds them securely in the grooves 86. A clear disc 80 of fused silica or sapphire forms a window which is secured to the end of the housing 78. This provides a flat surface against which the connector termini 20 fit.

A central metal pin 82 with a notch 85 in one end fits into the hole 84 and the hole through the center of the disc 80.

The pin 82 serves to align the terminus with a similar, and the notched end 85 provides for proper angular alignment of the two termini with respect to one another.

Figure 7:
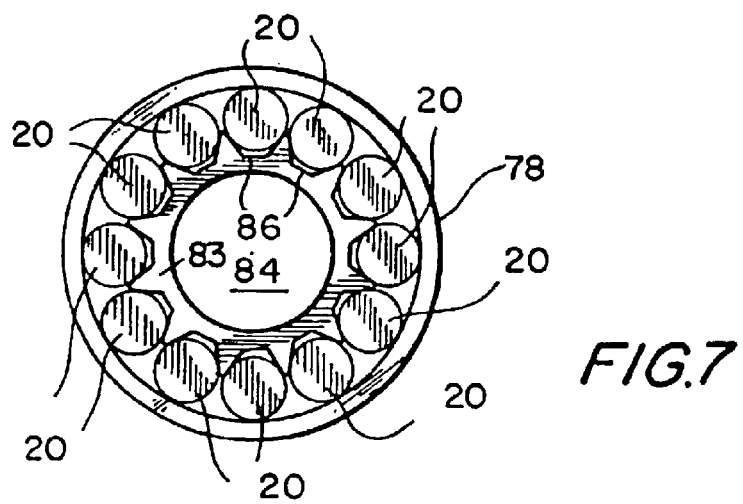
FIG. 7 is a cross-sectional view of the assembled device shown in FIG. 6.

Preferably, the individual cable termini 20 are potted in place after being assembled as shown in FIG. 7.

Preferred Coupler

FIG. 12 shows the preferred coupler 150 coupling two of the preferred termini 152 together. In basic principle, the coupler 150 and the termini 152 are essentially the same as those shown in FIG. 5. However, the curvatures of the reflectors are closer to those which would exist in actual products. Also, there are various improvements that facilitate manufacturing, durability, etc.

As in the FIG. 5 coupler, two fiber-optic cables 24 and 31 are coupled together.

Each terminus 152 includes a ferrule 154 (see FIG. 15). The ferrule 154 includes a reflector unit cavity 156 with a ledge 158 forming a seat for a reflector unit 178.

Slightly smaller in diameter is a cavity 160 into which a magnetically permeable alignment member 172 fits. Another chamber 162 still narrower in diameter, connects the chamber 160 with a small passageway 164 slightly larger than the diameter of the cable portion 28 fitting through it.

The ferrule has a flange 166, a section 168 of smaller diameter and an elongated barrel 170 complete the ferrule structure.

Referring again to FIG. 12, the magnetic member 172 is generally toroidal, like the member 38 shown in FIG. 1. it is smaller in diameter at its right end 174 than at its left end 175. Also, it has a relatively large frustro-conical entrance 176 for guiding the cable through its central hole. Overall, the largest diameter of the member 172, at its left end, is only slightly smaller than that of the chamber 160 into which it fits. This serves the purpose of roughly centering the member 172 in the cavity 160, whereas the smaller right end has more room to move, if needed, in order to align the cable core properly.

The large, tapered entrance ensures the cable end will pass through the center hole of the member 172.

The reflector unit 178 is basically the same as each reflector unit 41a or 41b shown in FIG. 5, except that the curvature of the large reflector is much less than the curvature shown in FIG. 5.

In addition, as shown in FIG. 13, the reflective coating 180 for the large reflector does not cover as much of the exterior of the reflector. Instead, a central circular area 182 of substantial size is left uncoated. Also, the area 182 is flat so as to minimize variations in spacing between the cable end and the reflector unit as the cable end moves to achieve alignment, and to prevent damage to the reflective coating 180.

The diameter of the uncoated area 182 is approximately the same as the diameter of the small reflector. Thus, the only losses caused by the uncoated area 182 are those inherent in the Cassegranian design.

The bumpers 48 preferably are attached permanently (by epoxy, e.g.) to the rear surface of the small reflector in each of the reflector units 178. When the two termini 152 are butted against one another end-to-end, as shown in FIG. 12, the bumpers 48 are the lead contact points between the two termini. They are preferably made of relatively pliable plastic so as to minimize the transmission of shock through the reflector bodies.

The coupler 150 comprises a cylindrical body 184 cut away at 186, 187, etc., to form a central section whose internal dimensions are closely matched to the outside diameter "D" (see FIG. 15) of the front portion of the ferrule 154, thereby holding the two termini accurately in alignment with one another.

Four spring arms or fingers 186 with hooks at the end are formed at each end of the coupler 150.

When the termini 152 are inserted into the ends of the coupler 150 and pushed together, the spring arms ride over the flange 166 and snap downwardly with the hook engaging the outside surfaces of the flanges to hold the two termini together firmly and securely.

The material of the coupler 150 can be thermoplastic, metal, or other material suited to the specific purpose and environment in which the coupler is to be used.

The construction of the coupler 150 is merely one example of the many different forms the mechanical structure of the coupler can take.

Preferred Manufacturing Method

FIGS. 15 through 17 illustrate the preferred manufacturing method for making one terminus 152.

Referring to FIG. 15, first, the alignment member 172 is inserted into the cavity 160. Next, the metal wall of the terminus around the cavity 156 is heated, as indicated at 188 to a moderate temperature above room temperature so as to moderately expand the dimensions of the chamber. Then, the reflector unit 48 is inserted into the cavity 156, and the partially assembled terminus is cooled. This provides a shrink fit to mount the reflector unit 178 in the ferrule securely.

Now referring to FIG. 16, with the ferrule 154 inverted from the position shown in FIG. 15, liquid epoxy resin is injected into the cavity 160 containing the alignment member 172, The chamber is filled with epoxy up to a level indicated at 192, which just covers the member 172 completely. Preferably, the liquid has a low viscosity, like that of water, and it is injected in a pre-measured quantity through a slim tube indicated schematically at 190, which is inserted into the ferrule briefly during filling, and then removed.

Now referring to FIG. 17, next, the cable end, which has been stripped and cleaved, is inserted into the ferrule until the cable end is very close to the flat area 182 on the reflector unit 178. Then, a rotating magnetic field is applied around the element 172, as indicated at 196, and as more fully described above, while diffuse white light is shined into the cable to send a signal 198 to a receiver and equipment to determine the position at which the signal is maximum, all as described above. Light is sent into the unit, as indicated at 194, through the reflector unit 178.

The light that is applied at 194 does double duty. It irradiates the light-curable epoxy resin in the cavity 160, and solidifies it just as the cable reaches proper alignment, and also creates the signal 198 used for alignment purposes. This procedure is believed to require only a few seconds to perform.

The manufacturing process is relatively simple, fast and inexpensive, and produces a superior coupling and termini.

Transducer Device

FIG. 18 is a partially cross-sectional and partially schematic view of a transducer device 200 constructed in accordance with the invention.

The device 200 includes a support structure 202 with a flat base portion 204 and a platform 206 supporting an electro-optical transducer 208.

The transducer 208 has an input/output port indicated generally at 210 which is aligned with a double-reflector optical system 178 which is the same as the unit 178 described above and shown in FIGS. 12–17.

If the transducer 208 is a light source, the double-reflector system 178 spreads the light to greatly enlarge the light beam emitted by the transducer, and emits it in collimated beams as indicated at 214 in FIG. 18.

If the transducer 208 is a detector, then the double reflector unit 178 receives light beams 214 and concentrates or focuses them at the input/output port 210. By expanding the beam and collimating it, the beam is ready to be coupled readily with a coupler for a fiber-optic cable, or for another device. The spreading of the beam makes the optical system much less susceptible to dirt and other error-causing debris, and greatly reduces the sensitivity of the device to coupling positioning errors.

In accordance with one embodiment of the invention, alignment of the transducer 208 with the reflector system 178 is achieved by the use of a conventional micro-positioner 218. The micro-positioner is capable of adjusting the position of the transducer 208 vertically along the Z axis and horizontally along the X and Y axes (see FIG. 19 as well as FIG. 18) in order to align the transducer with the unit 178.

Alternatively, an electromagnetic position adjusting system, as described below, can be used to position the reflector unit 178 relative to a stationary transducer unit 208, thus avoiding the use of a micro-positioner.

Transducer Types

The transducer device of the present invention is capable of operating with almost any type of small light source or detector.

Usable light sources include Light-Emitting Diodes ("LEDs"); laser diodes, Vertical Cavity Surface Emitting Lasers ("VCSELs"); stripe-form laser devices; and other semi-conductor light-emitting devices.

Some of the transducers, such as LEDs, produce diffused output light, and some have lenses for creating narrow beams of light.

Similarly, laser devices of the type mentioned above produce beams in various shapes, generally of a narrow beam width.

In essence, essentially any devices usable as fiber-optic transmitters or receivers are transducers with which this invention is usable advantageously.

If desired, a hermetically-sealed transducer unit can be made by forming a hermetically-sealed housing indicated schematically at 220 around the components (after the micro-positioner 218 has been removed). The transducer 208 is, of course, secured in place when alignment has been achieved so that alignment will be maintained during use of the device 200. This can be done by curing epoxy resin, or by other known means.

Alternatively, hermetic seals can be used at the interface between the inlet/outlet port 210 and the reflector unit 178. For this purpose, glass frits of an index of refraction matching that of the reflector unit 178 can be melted around the interface between the port 210 and the reflector unit.

FIG. 20 is a schematic and partially cross-sectional view of another embodiment 222 of the transducer device of the present invention. This embodiment is shown in use in a structure with internal walls, such as the wall 226, a glass outlet window 230 and a fiber-optic cable 226 forming one type of optical transmission structure to transmit light from the transducer 208 if it is a light emitter, or to transmit light to the unit 208, if it is a detector.

This embodiment of the invention includes a first ferrule 224 similar in many respects to the ferrules shown in FIGS. 12 through 17, except that there is no reflector unit 178. Instead, there is only the bead 172 made of electromagnetically permeable material surrounding the end of the fiber conductor 28. This construction is used to align the fiber conductor 28 with the inlet/outlet port 210 of the transducer 208.

An electromagnetic field, preferably rotating, is supplied outside of the ferrule 224 to properly align the conductor 28 with the outlet port, substantially in the manner described above.

The bead and the conductor end are secured in a proper alignment position by radiation-hardenable epoxy resin in the chamber holding the bead 172, substantially as described above. Although it is not shown in FIG. 20, a structure is provided to support the ferrule 224 with respect to the base 230 of the transducer device 208 so as to hold the fiber-optic cable end in alignment with the port 210.

If preferred, the body of the ferrule 224 can be extended as indicated by dashed lines 225 and internally threaded to fit onto external threads on the port extension 210. Similar mounting structures can be provided by those skilled in the art, within the scope of the present invention.

The fiber-optic cable 26 extends through a bushing 232 in a hole in the wall 226 into a second terminus 228, which is preferably substantially the same as one of the termini shown in FIGS. 12 through 17. That is, it has a ferrite bead 172 and a reflector unit 178. The ferrite bead 172 is used in the manner described above to align the right end of the cable core or conductor 28 with the reflector block 178.

Light is emitted through the window 230, or received through it to communicate with the transducer 208.

Again, as with the embodiment shown in FIGS. 18 and 19, a hermetically sealed housing 232 can be provided in order to form a hermetically sealed transducer unit with a very wide output beam or input receptive area, so as to achieve the advantages described above.

Alternative Alignment Structure and Method

It should be understood that it is not necessary to move only a fiber-optic conductor when aligning such a conductor with a reflector unit or other optical device or system. Motion of one of the two structures relative to the other is all that is necessary. Therefore, as described above, it is within the scope of the present invention to provide a magnetically permeable ring or similar member around the body of the reflector unit 178, and locate it in a chamber slightly larger than its outside diameter, and use the electromagnetic field aligning mechanism to move the reflector unit relative to the fiber-optic conductor or other object, such as an input/output port to the transducer, in order to create the proper alignment desired.

Thus, in this alternative embodiment, the device in FIG. 18 would not use a micro-positioner such as 218, but would use this alternative alignment structure and method, in which the inside diameter of the support structure 212 for the reflector unit 178 would be of a somewhat larger diameter, and a ring of ferro magnetic material would encircle the unit 178. The reflector unit then would tend to be aligned perpendicular to the plane of least reluctance of the magnetic field around it.

Reflection Suppression

One of the problems with any junction between the ends of fiber optic cables is the problem of back-reflections of signals at air-to-fiber interfaces. The techniques used to suppress such reflections include rounding the ends of the cable; filling the air gap between fiber ends with an index-matching gel; cutting the ends of the fibers at an angle ("angle polish" technique); butting the ends of the cores together; and the use of anti-reflecting coatings, etc.

The use of only an anti-reflective coating on the surface of the reflector unit 178 is not believed to provide sufficient attenuation of reflections for most fiber-optic cable communications systems. Therefore, the use of another suppression device and method is preferred.

The suppression device used is shown in FIG. 21.

FIG. 21 is an enlarged, cross-sectional view of a reflector block 250 made of light-transmissive glass or plastic with a curved fist surface 252, an opposed second surface 254, with a reflective coating 260 on the surface 252, except in a flattened area 256 which forms an inlet-outlet port.

A small convex reflector 258 is opposite the reflector 260. A bumper 48 is provided, as described above. The construction of the reflector block 250 is the same as the block 178 except that the inlet/outlet surface 254 is slightly convex instead of being flat. Preferably, the shape of the surface 254 is parabolic.

The effect of the curvature of the surface 254 is that the reflected beams such as beams 266 and 268 are at an angle A with respect to the beams leaving the reflector block. When they have been reflected by the reflectors 260 and 258, they do not intersect the fiber core 270 and instead pass outside it, as shown by arrows 264. This produces very effective reflection suppression.

The exiting beams are slightly refracted when they exit the surface 254, and this is taken into consideration when designing the reflector block so that the output beams 262 are parallel to one another.

If desired, the surface 254 also can be coated with an anti-reflective coating to increase the suppression of reflections, although the suppression structure and method is believed to produce sufficient suppression for most purposes by itself.

It should be understood that the structure and method described above are useful in aligning the reflector unit 250 with any light source or receiver, as well as with a fiber optic light conductor so as to be useful with transducers as well as cable.

Definition of Terms

Certain of the terms used above in this specification bear definition, for the purposes of this patent application.

The term "light" as used in this patent application is intended to include electromagnetic radiation other than visible light. It specifically includes infrared and ultraviolet radiation and other electromagnetic radiation in the electromagnetic spectrum near the spectral range of the radiation mentioned above.

The term "fiber-optic cable" includes both single-mode and multiple-mode cable, even though the example described is a single-mode cable. It also includes "hollow-core" fiber-optic cable in which light is conducted through the air as a central conductor.

The term "in the field" is used to refer to work done outside of a laboratory, factory or other such facility. It is envisioned that the processes described here as being performable "in the field" would include those capable of being performed in mobile repair trucks, in the customer's place of business, etc. Under emergency conditions the term also might include repairs made in the open air.

"Radiation-curable" materials usable in the invention include epoxy resins and similar substances curable by exposure to ultra-violet, infra-red, gamma or other radiation.

The term "reflector unit" includes not only the specific Ritchey-Chretien and Cassegrainian systems, but similar reflecting system which have been found useful in telescopes or similar optical devices.

"Magnetic member" means a magnetically permeable member.

"Transducer" is intended to describe any device for converting electrical signals into light, infrared or other radiation in non-visible regions of the electromagnetic spectrum, or for converting electromagnetic radiation signals such as light, etc., into electrical signals.

The above description of the invention is intended to be illustrative and not limiting. Various changes or modifications in the embodiments described may occur to those skilled in the art. These can be made without departing from the spirit or scope of the invention.

What is claimed is:

1. An aligning device for aligning a multiple-reflector collimating system with a source point, said multiple-reflector collimating system comprising:
   a first reflector positioned to receive light from said source and reflect said light towards a second reflector; and
   a second reflector which is substantially larger than said first reflector, said second reflector being positioned to receive light from said first reflector and reflect said light to an outlet;
   said reflectors being dimensioned and positioned to spread and collimate the light emitted from said outlet, said aligning device including;
   an optical viewing device for viewing said source point through said outlet; and
   an adjustment device for moving said source point and said collimating system relative to one another.

2. A device as in claim 1 in which said collimating system comprises a solid light-transmitting body having two opposed side walls,
   said first reflector being formed in a first one of said side walls,
   said outlet being located at said first side wall, literally adjacent said first reflector,
   said viewing device being positioned to detect images through said outlet portion of said first side wall.

3. A device as in claim 1 in which said viewing device includes a microscope.

4. A device as in claim 1 in which said viewing device is a video camera adapted to enlarge and display said source point and environs on a video display device.

5. A device as in claim 1 in which said adjustment device comprised a magnetic member coupled to one of said collimating system and a structure on which said source point is located, and including variable magnetic field developing means for magnetically moving said magnetic member, and control means for controlling said magnetic field developing means.

6. A device as in claim 1 in which said adjustment device comprises a controllable micro-positioner for positioning said collimating system and said source point relative to one another.

7. A device as in claim 6 including a transducer upon which said source point is located, and a support structure for mounting said transducer and said collimating system with respect to one another, said micro-positioner being adapted to position said transducer on said support structure.

8. A device as in claim 5 in which said source point is on the end of a fiber optic cable conductor and said magnetic member encircles said conductor adjacent said end, and said field developing means includes means for developing independently variable flux fields in at least two ortogonal directions.

9. A device as in claim 1 in which said first reflector forms a surface of revolution about an optical axis through said point, and in which said second reflector forms a surface of revolution about said axis, and has a hole through which said axis passes, said source point being visible through said hole from said outlet.

10. A device as in claim 1 in which said source point is laterally spaced from said second reflector and said outlet is laterally spaced from said first reflector.

11. A device as in claim 1 including a resin-curing radiation source positioned to beam radiation to said source point, said radiation having a wavelength substantially different from that of radiation passing through said collimating system.

12. A method of aligning a multiple-reflector collimator with a source point, said collimator comprising
    a first reflector positioned to receive light from said source and reflect said light towards a second reflector;
    a second reflector which is substantially larger than said first reflector, said second reflector being positioned to receive light from said first reflector and reflect said light to an outlet;
    said reflectors being dimensioned and positioned to spread and collimate the light emitted from said outlet;
    an optical viewing device for viewing said source point through said outlet; and
    an adjustment device for moving said source point and said collimating system relative to one another;
    the steps of viewing said source point and operating said adjustment device until said collimating system and said source point are aligned with one another.

13. A method as in claim 12 including forming a target for alignment of said source point with said collimator, and operating said adjustment device until said source point is aligned with said target.

14. A method as in claim 13 including using a programmed digital controller to control said adjustment device to bring said target and said source point into alignment with one another.

15. A method as in claim 12 including the step of providing a radiation-curable liquid for holding said collimator and said source point in alignment with one another upon curing, and the step of directing curing radiation towards said liquid to cure and harden said liquid when said collimator and said source point are aligned with one another.

16. A method as in claim 15 including selecting said radiation to have a wavelength substantially different from that of any signals transmitted through said collimator.

17. A method as in claim 15 including selecting said radiation to have a wavelength visible to said optical viewing device.

* * * * *

UNITED STATES PATENT AND TRADEMARK OFFICE
CERTIFICATE OF CORRECTION

PATENT NO. : 6,865,333 B2
DATED : March 8, 2005
INVENTOR(S) : David R. Porter and David E. Loyd It is certified that error appears in the above-identified patent and that said Letters Patent is hereby corrected as shown below:

<u>Title page,</u>
Item [75], Inventors, the correct spelling of the inventor's name is -- David E. Loyd --.

Signed and Sealed this

Fourth Day of October, 2005

JON W. DUDAS
*Director of the United States Patent and Trademark Office*